Jan. 24, 1933.　　　A. HERNDON　　　1,895,037

CAP DRIVER

Filed March 16, 1932　　　4 Sheets-Sheet 3

Inventor

Alton Herndon

By Clarence A. O'Brien
　　　Attorney

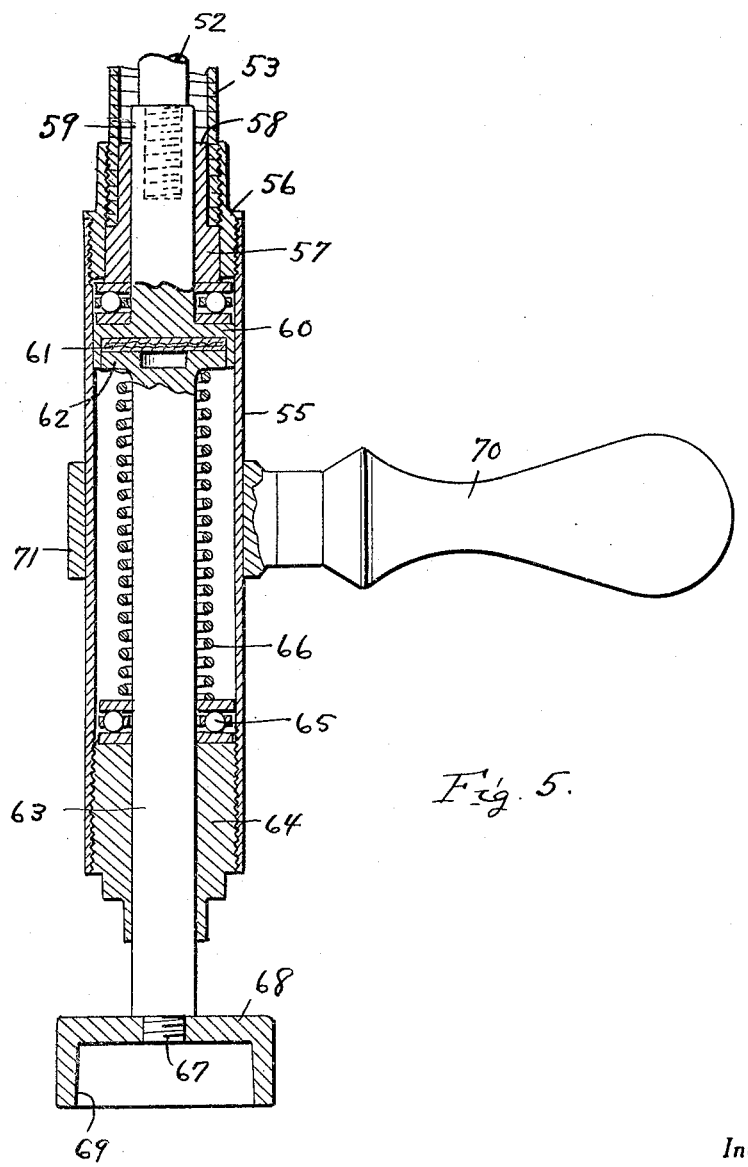

Patented Jan. 24, 1933

1,895,037

UNITED STATES PATENT OFFICE

ALTON HERNDON, OF WALTHAM, MASSACHUSETTS

CAP DRIVER

Application filed March 16, 1932. Serial No. 599,281.

This invention appertains to new and useful improvements in means for driving screw caps onto receptacles.

The principal object of this invention is to provide a substantially automatic mechanism whereby screw caps can be applied to receptacles in a quick and efficient manner.

Another important object of the invention is to provide a screw cap applying mechanism wherein the cap driver can be easily handled and employable at various angles.

These and other important objects and advantages of the invention will become apparent to the reader of the following specification.

In the drawings:—

Fig. 5 represents a fragmentary enlarged sectional view through the driver cap mount and clutch means.

Figure 1:
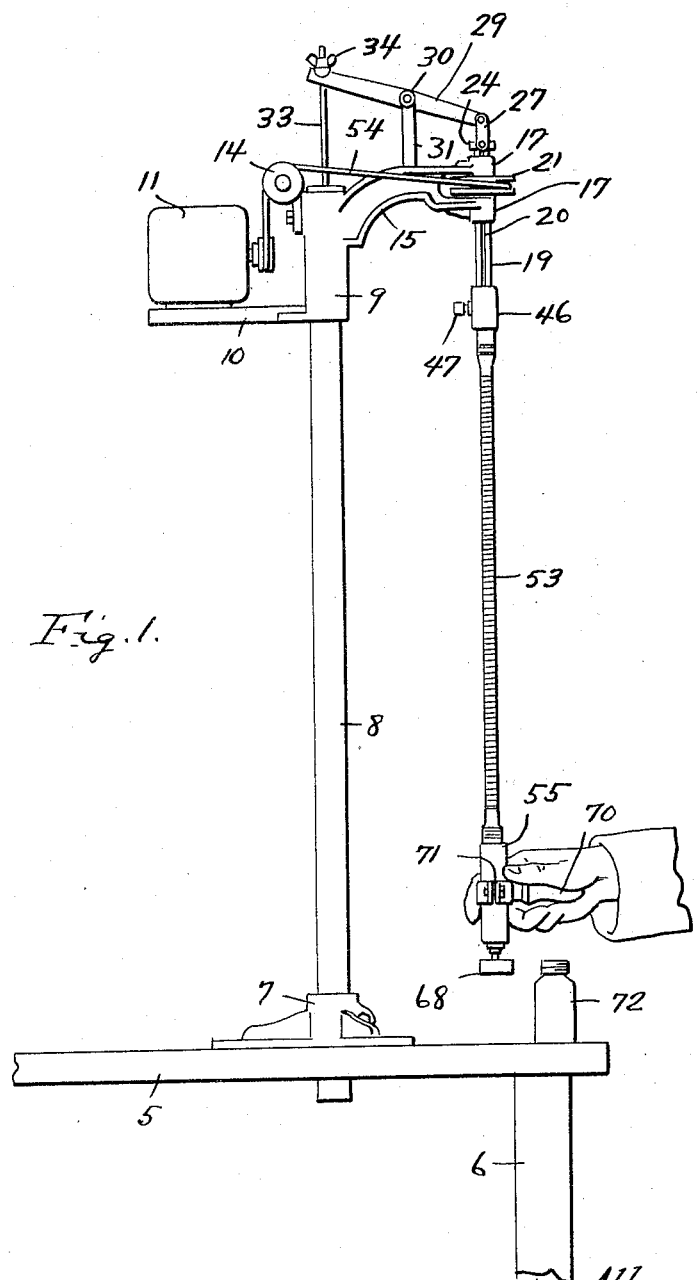
Figure 1 represents a side elevational view of the mechanism in its entirety.

Referring to the drawings wherein like numerals designate like parts, it can be seen that numeral 5 represents a platform, having a suitable support 6. Mounted upon this platform 5 is a clamp 7 thru which the hollow post 8 is slidably adjustable.

A sleeve 9 is secured to the upper portion of the post 8 and has a plate 10 extending horizontally therefrom and upon which the electric motor 11 is mounted. The armature shaft of this motor 11 carries a pulley wheel 12, while a bracket 13 on the barrel 9 supports a pair of pulley wheels 14—14 in the diverged relation shown clearly in Fig. 3.

Extending horizontally from the barrel 9 in an opposite direction with respect to the blade 10 is the reinforced arm 15 bifurcated at its free end to provide the pair of extensions 16—16 each terminating in a collar 17 provided with a grease cup 18. Slidable through the collars 17—17 is the shaft 19 which is provided with a longitudinally extending groove 20 therein.

Disposed between the extensions 16—16 of the arm 15 is the large pulley wheel 21 which is provided with a key or other projection 22 bearing into the groove 20 of the shaft 19, whereby the pulley 21 is splined to the shaft, thus permitting the shaft to slide through the collars 17—17 and the pulley 21.

The upper end of the shaft 19 is provided with a groove 23 and opposed to this groove 23 is the grooved inner side of a collar 24. This collar 24 is secured to the shaft 19 by the ball bearings 25 which are interposed between the grooved surfaces of the shaft 19 and collar 24. The collar 24 is provided with pintles 26—26 which extend through openings in the lower ends of the links 27 which depend from the pin 28 at one end of the rocking beam 29 fulcrumed as at 30 upon the upper end of the upright 31 on the arm 15.

Figure 2:
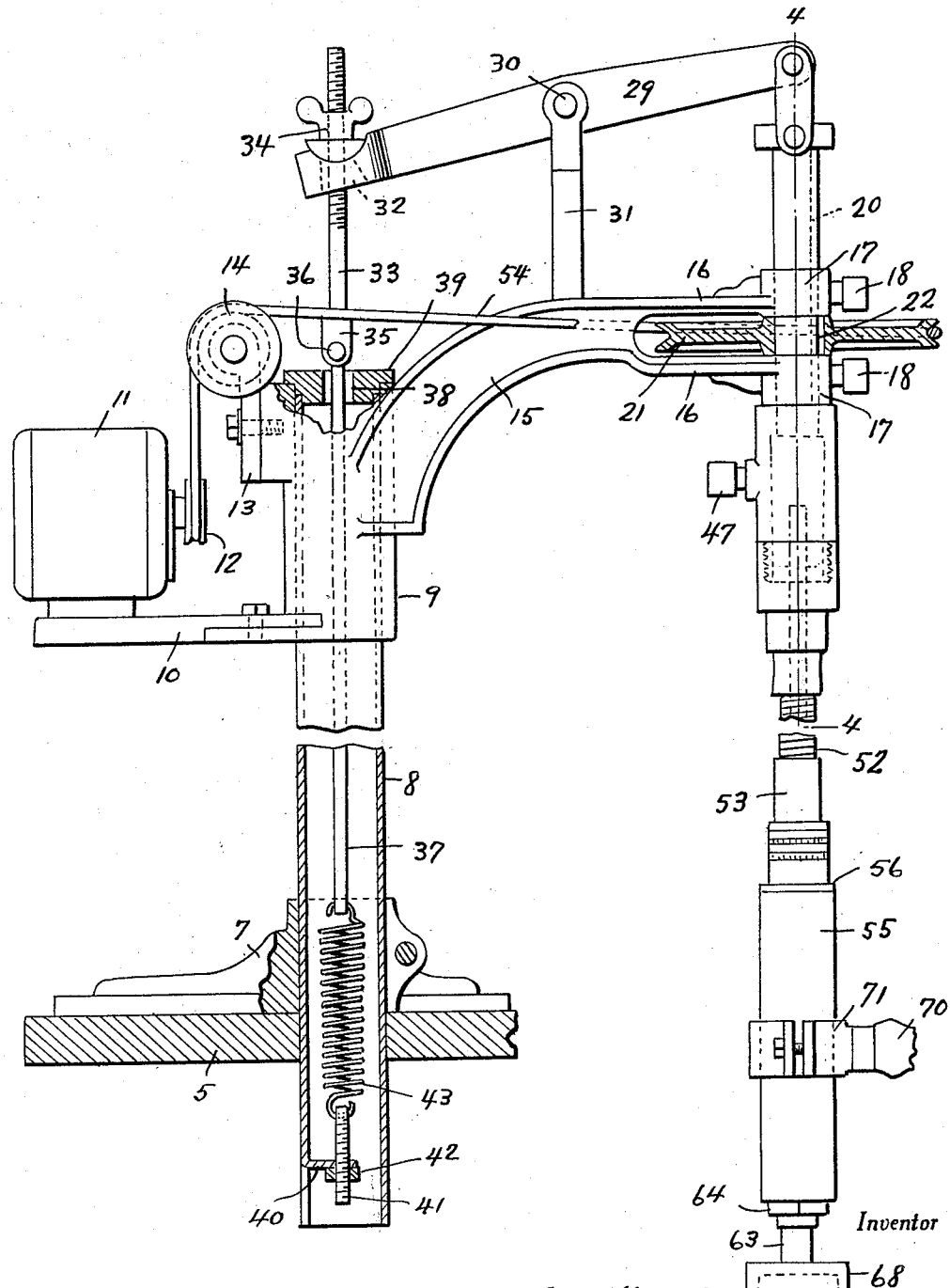
Fig. 2 represents a fragmentary side elevational view of the mechanism partly broken away to disclose the spring take-up means.

The other end of the beam 29 is provided with an opening 32 of upwardly tapering shape and through this opening extends the threaded rod 33, the rod being provided with a wing nut 34 which can be adjusted against the top side of the beam 29 as shown in Fig. 2.

The lower end of this rod 33 is provided with a yoke 35 pivotally secured as at 36 to the upper end of the rod 37, which extends through the opening 38 in the plug 39 of the upper end of the post 8.

The lower end of the post 8 is struck out to provide an inturned lug 40 having an opening therein to receive the threaded eye bolt 41 which has a nut 42 thereon bearing against the lug to permit adjustment of the spring 43 which is interposed between the eye bolt 41 in the lower end of the aforementioned rod 37.

Figure 4:
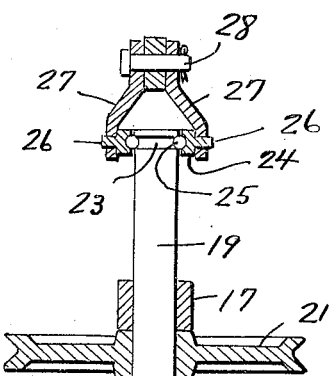
Fig. 4 represents a vertical sectional view taken substantially on line 4—4 of Fig. 2.

The lower end of the shaft 19 (see Fig. 4) is provided with a cylindrical enlargement 44 which bears against the internal shoulder 45 of the shell 46. The shell 46 is provided with a grease cup 47 and is externally threaded at its lower end to engage into the internally threaded fitting 47, the latter being provided with a bore for journally receiving the pintle 48 which has a thrust collar 49 at its inner end for thrust against the fitting 47, while a polygonal-shaped extension 50 is provided thereon for projection into the correspondingly shaped opening 51 in the enlarged end portion 44. The upper end of the flexible drive shaft 52 connects to the spindle 48, while a stationary tubular conduit 53 encompassing the shaft 52 attaches at its upper end to the fitting 47.

Figure 3:
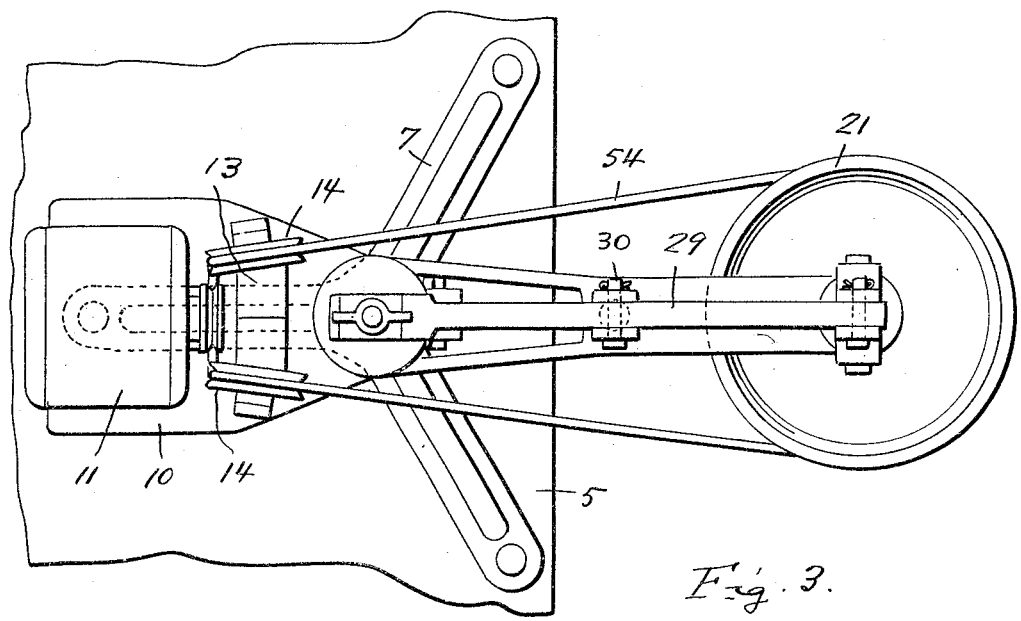
Fig. 3 represents a top plan view of the mechanism.

Numeral 54 represents an endless belt or strand which is trained under the pulley 12 of the motor 11, over the pulleys 14—14 and around the large pulley 21 as in the manner substantially shown in Figs. 2 and 3.

The driving cup is clearly shown in Fig. 5, and in referring to this figure, it can be seen that numeral 55 represents an elongated barrel provided with internal threads at each end thereof. The upper end of the barrel 55 receives the internally threaded bushing 56 which in turn receives the lower end of the tubular conduit 53.

Numeral 57 represents a bushing on the inside of the bushing 56 and this is provided with a spacing extension 58 interposed between the spindle 59 and the conduit 53. The lower end of the flexible drive shaft 52 attaches to the spindle 59 as is clearly shown in Fig. 5. The lower end of the spindle 59 is provided with a cup-shaped structure 60 in which is located some friction material 61, while bearing into the cup and against the friction material 61 is the clutch plate 62 on the upper end of the shaft 63.

Numeral 64 represents a bushing seatable longitudinally in the lower end of the barrel 55 and against the ball bearing mount 65 which is interposed between the plug or bushing 64 and the lower end of the compressible coiled spring 66, the latter having its upper end impinging against the clutch plate 62. The lower end of the shaft 63 is provided with a threaded extension 67 engaged into the cap receiving cup 68, the latter being provided with an upwardly tapering pocket 69 therein into which a cap of the threaded type can wedge.

Obviously, these cups 68 are interchangeable, permitting the cups to be attached to the shaft 63 for accommodating caps of various size.

Numeral 70 represents a handle equipped with a clamp band 71 of the split type which can be engaged around the barrel 55 whereby the barrel and its adjuncts can be manually handled with ease.

It can be seen in Fig. 1, that a cap can be wedged into the cup 68 and the cap positioned over the receptacle 72. With the cap properly positioned on the receptacle, the motor 11 can be started and obviously rotary motion will be transmitted through the flexible shaft 52, through the cup 60 and clutch plate 62 to the cup 68 which carries the cap.

Obviously, when the cap has been completely screwed onto the receptacle, the resistance will overcome the friction between the plate 62 and the cup 60 resulting in slippage between the plate 62 and the cup 60.

When the handle 70 is released, the cup 68 will automatically pull off of the applied cap on the bottle 72, due to the tension of the spring 43, which is under tension when the cap applying cup 68 is in operation against the receptacle.

It will also be seen, that due to the flexible construction of the drive shaft and its conduit 53, the cap applying cup, and associated adjuncts can be moved to various angular positions without affecting the rigid mechanism mounting at the upper end of the post 8.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A cap applying mechanism comprising a platform, a post vertically adjustable on the platform, a motor supported by the post, a flexible drive shaft, a pulley having a fixed support, drive means between the motor and the pulley, a shaft splined to the pulley, one end of the shaft being secured to the flexible drive shaft, tensioning means associated with the opposite end of the splined shaft for normally elevating the shaft and a cap applying device at the other end of the flexible shaft.

2. A cap applying mechanism comprising a platform, a post vertically adjustable on the platform, a motor supported by the post, a flexible drive shaft, a pulley having a fixed support, drive means between the motor and the pulley, a shaft splined to the pulley, one end of the shaft being secured to the flexible drive shaft, tensioning means associated with the opposite end of the splined shaft for normally elevating the shaft, a cap applying device at the other end of the flexible shaft, said cap applying device comprising a cap receiving cup provided with a shaft extension, and clutch means between the shaft extension and the flexible shaft.

3. A power driven capper comprising a power driven shaft, a barrel, a cap receiving cup member, said cup being provided with an inwardly tapering pocket, a driven shaft extending into the barrel from the cup, friction clutch means between the opposed ends of the shafts, said friction clutch including a clutch member on the driven shaft and a clutch member on the drive shaft, a screw adjustable bushing in the barrel, and a spring interposed between the bushing and the clutch element on the driven shaft.

4. A capping mechanism comprising a post, a cap receiving member, a drive shaft having one end secured to the cap receiving member, a pulley mounted on the post, power drive means for the pulley, said shaft being splined through the pulley, and spring take-up means for elevating the shaft through the pulley.

5. A capping mechanism comprising a post, a cap receiving member, a drive shaft having one end secured to the cap receiving member, a pulley mounted on the post, power drive means for the pulley, said shaft being splined through the pulley, spring take-up means for elevating the shaft through the pulley, said means comprising a rockable beam having one end secured to the upper end of the shaft, and a spring interposed between the other end of the beam and the post.

In testimony whereof I affix my signature.

ALTON HERNDON.